United States Patent [19]

Tanaka et al.

[11] Patent Number: 4,754,908
[45] Date of Patent: Jul. 5, 1988

[54] PROCESS FOR PREPARING A TAPE GUIDE CYLINDER

[76] Inventors: Masamitsu Tanaka, No. 5-20-11, Aoto, Katsushika-ku, Tokyo; Koji Kondo, No. 4-4-1, Kobogaoka, Chikusa, Nagoya; Mamoru Usami, c/o Sanwa Needle Bearing Co., Ltd., No. 5-30-4, Aoto, Katsushika-ku, Tokyo, all of Japan

[21] Appl. No.: 853,889
[22] Filed: Apr. 21, 1986
[30] Foreign Application Priority Data Oct. 15, 1985 [JP] Japan ................................ 60-229630

[51] Int. Cl.$^4$ ............................................ B65H 23/08
[52] U.S. Cl. ...................................... 226/190; 72/368
[58] Field of Search .................. 72/333, 348, 349, 368; 29/148.4 D, 125.5; 226/190, 194

[56] References Cited

U.S. PATENT DOCUMENTS

| 1,216,282 | 2/1917 | Carver et al. | 72/348 |
| 1,697,035 | 1/1929 | Wells | 72/349 |
| 1,845,122 | 2/1932 | Briney | 29/90 R |
| 1,914,647 | 6/1933 | Raule | 51/291 |
| 2,150,708 | 3/1939 | Andrews et al. | 72/368 |
| 3,229,353 | 1/1966 | Morrison | 29/417 |
| 3,348,511 | 10/1967 | Cowles | 72/349 |
| 4,037,769 | 7/1977 | Meyers | 226/190 |
| 4,397,170 | 8/1983 | Seebach, Jr. | 72/68 |
| 4,403,720 | 9/1983 | Grant | 226/190 |

FOREIGN PATENT DOCUMENTS 60-38778 2/1985 Japan .

Primary Examiner—Lowell A. Larson
Attorney, Agent, or Firm—Sandler & Greenblum

[57] ABSTRACT

A process for preparing a tape guide cylinder is disclosed, which includes the steps of deep-drawing a sheet metal material progressively to form an elongated cylinder with a bottom, subjecting the resulting cylinder to flange-machining to form a flange at its open end, thereafter removing the bottom of the cylinder, subsequently trimming the flange from the cylinder, and finally subjecting the resulting cylinder at either of its ends to a beat-machining for finishing the shape of the elongated cylinder.

The tape guide cylinder thus prepared may further be subjected at its circumference, to a precision finish for providing an outer diameter of less than 6 mm but more than 5.2 mm.

19 Claims, 6 Drawing Sheets

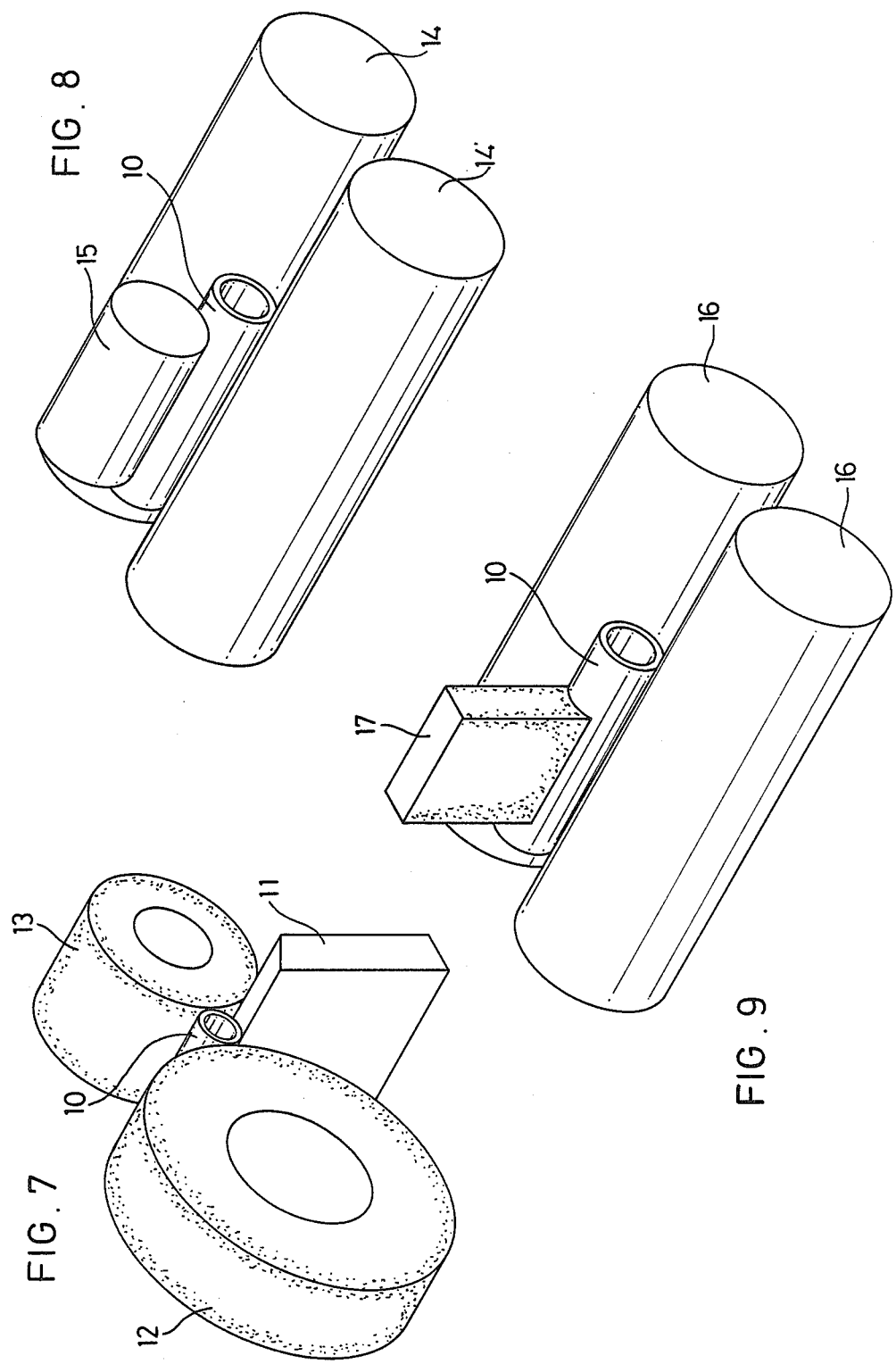

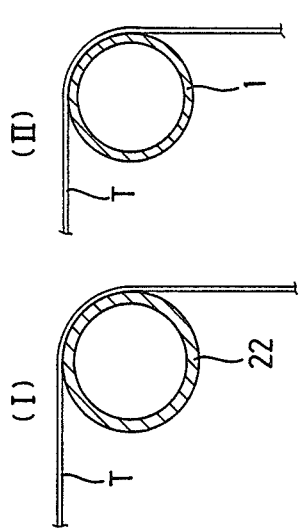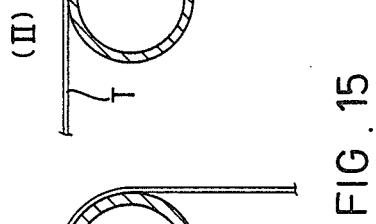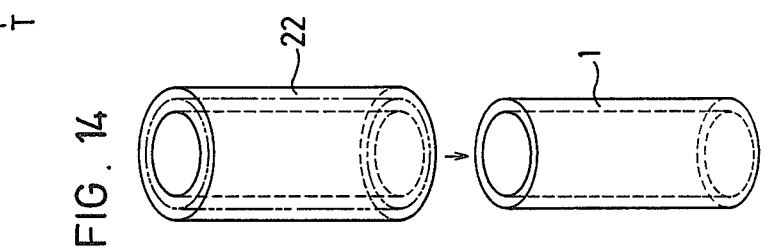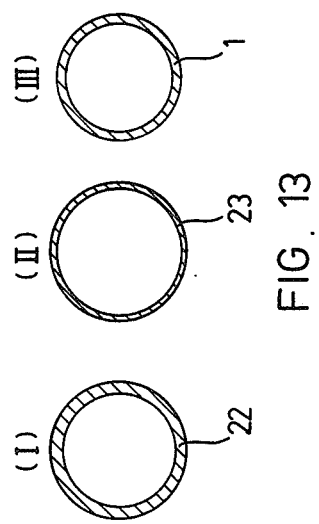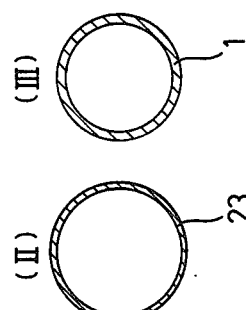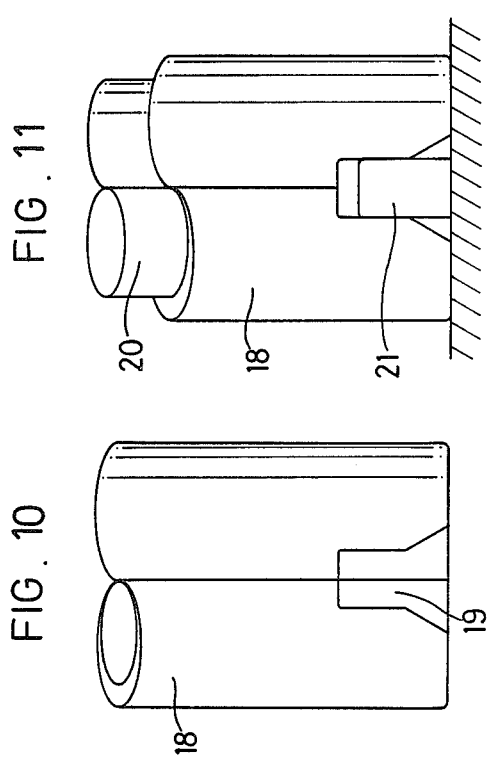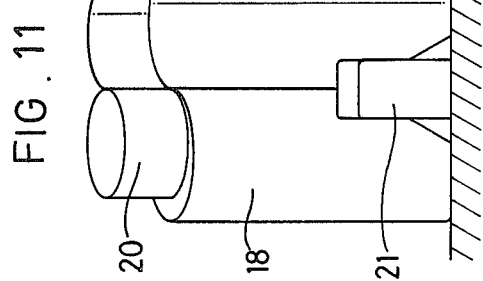

PROCESS FOR PREPARING A TAPE GUIDE CYLINDER

FIELD OF THE INVENTION

This invention relates to a process for preparing a tape guide cylinder, which may be produced at a low cost and is suitable for use in a cassette case of, for example, a tape-recorder or a video cassette tape of a VHS system.

BACKGROUND OF THE INVENTION

A tape guide cylinder mounted in a cassette case of various devices, such as a tape-recorder or a video cassette tape, is an important component for ensuring the constant running operation of the tape, such as recording, playing back or rewinding.

For this reason, an extremely high precision of its size is essential while at the same time a large cost reduction is necessary for mass consumption. Consequently, development and research have been positively carried out for achieving the improvement in materials.

As an example, plastics of a low cost, brass or aluminium alloy of a low cost having excellent grinding ability have been utilized for producing the tape guide cylinder, or the tape guide cylinder made of brass or aluminium alloy has been provided with a hard chrome plating at its outer circumference.

However, the plastic material is defective in durability and wear-resistance, while the brass or the aluminium alloy is also poor in durability for practical use. On the other hand, the tape guide cylinder made of brass or aluminium alloy provided a hard chrome plating at its outer surface, is high in production costs, especially the processing step for providing the hard chrome plating costs more than the cylinder itself, which does not reduce the production costs.

In view of the foregoing, there has been proposed a process for preparing the tape guide cylinder at a low cost with improved durability and wear-resistatnce, as well as for preparing the product of a light weight (Japanese Opened Patent Application No. 38778/85). However, the process needs further improvement to obtain a degree of high precision with respect to the recent technical progress.

Since such type of the tape guide cylinder is an important component for ensuring constant running operation, as stated previously, its original shape (especially its size) has strictly been maintained to avoid mis-alignment with existing devices, so that its modification has never been studied to achieve a reduction in cost.

Accordingly, an object of the invention is to reduce the production costs through a consistent process, improve the durability, the wear-resistance and the precision of the final product, as well as to achieve the weight reduction of the tape guide cylinder.

SUMMARY OF THE INVENTION

In order to achieve the above object, one aspect of the invention provides a process for preparing a tape guide cylinder, which comprises the steps of:
deep-drawing a sheet metal material progressively to form an elongated cylinder with a bottom,
subjecting the resulting cylinder to a flange-machining to form a flange at its open end,
thereafter removing the bottom of the cylinder,
subsequently trimming the flange from the cylinder, and
finally subjecting the resulting cylinder, at its either end, to a beat-machining for finishing a shape of the elongated cylinder.

Another aspect of the invention provides a process for preparing a tape guide cylinder, which comprises the steps of:
deep-drawing a sheet metal material progressively to form an elongated cylinder with a bottom,
subjecting the resulting cylinder to a flange-machining to form a flange at its open end,
thereafter removing the bottom of the cylinder,
subsequently trimming the flange from the cylinder, and
subjecting the resulting cylinder, at its either end, to a beat-machining for shaping the elongated cylinder,
then grinding an outer circumference of the elongated cylinder, and
finally subjecting the outer circumference of the elongated cylinder to a precision finishing up to an outer diameter of more than 5.2 mm but less than 6.0 mm.

In accordance with the invention, the sequential machining steps of deep-drawing progressively, flanging, bottom-removal, flange-trimming for preparing the tape guide cylinder from a sheet metal material achieves the improvement in durability and wear-resistance of the product as well as the reduction in production cost, while the beat-machining may improve the precision. Further, the precision finishing of the outer circumference for reducing the outer diameter provides the improved precision and the weight reduction of the product without adversely affecting its mounting position and performance.

BRIEF DESCRIPTION OF THE DRAWINGS

For better understanding, the invention will now be described for its non-limiting preferred embodiment hereinbelow with reference to the accompanying drawings, in which:

FIG. 7 is a schematic perspective view during the grinding step;

FIG. 8 is a schematic perspective view during the roller-burnishing step;

FIG. 9 is a schematic perspective view during the super-finishing step;

FIG. 10 is an enlarged front view of another embodiment of the tape guide cylinder;

FIG. 11 is an enlarged front view showing its mounted state of the tape guide cylinder of FIG. 10;

FIG. 13 is a cross-sectional view comparing the tape guide cylinder according to the invention with a conventional one;

FIG. 14 is a perspective view comparing the tape guide cylinder according to the invention with the conventional one;

FIG. 15 is a cross-section showing contact state of the tape, comparing the tape guide cylinder according to the invention with the conventional one; and FIG. 16 is a sectional view of the mounted state of the tape guide cylinder to a cassette case of a beta-matrix system.

PREFERRED EMBODIMENTS OF THE INVENTION

Figure 1:
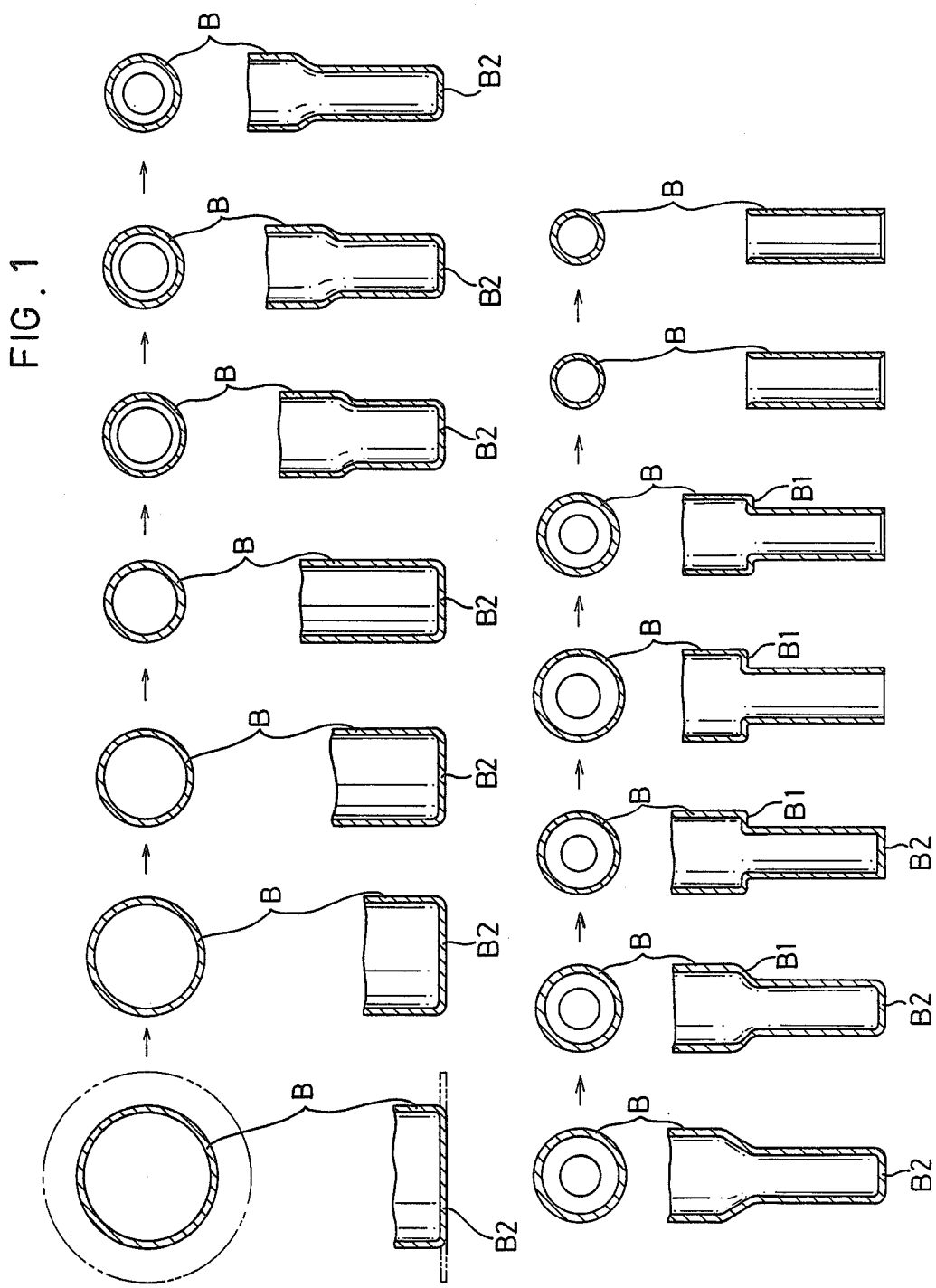
FIG. 1 is a plan view with a longitudinal section of a blank shape showing the machining steps, such as a tansfer machining system.

In the drawings, reference 1 represents a tape guide cylinder, which is formed by deep-drawing a sheet metal material to form an elongated cylinder with a bottom, subjecting the resulting cylinder to a flange-machining to form a flange at its open end, thereafter removing the bottom of the cylinder, subsequently, trimming said flange from the cylinder, and finally, subjecting the resuling cylinder, at its either end, to a beat-machining for finishing a shape of the elongated cylinger, as shown in FIG. 1.

Figure 2:
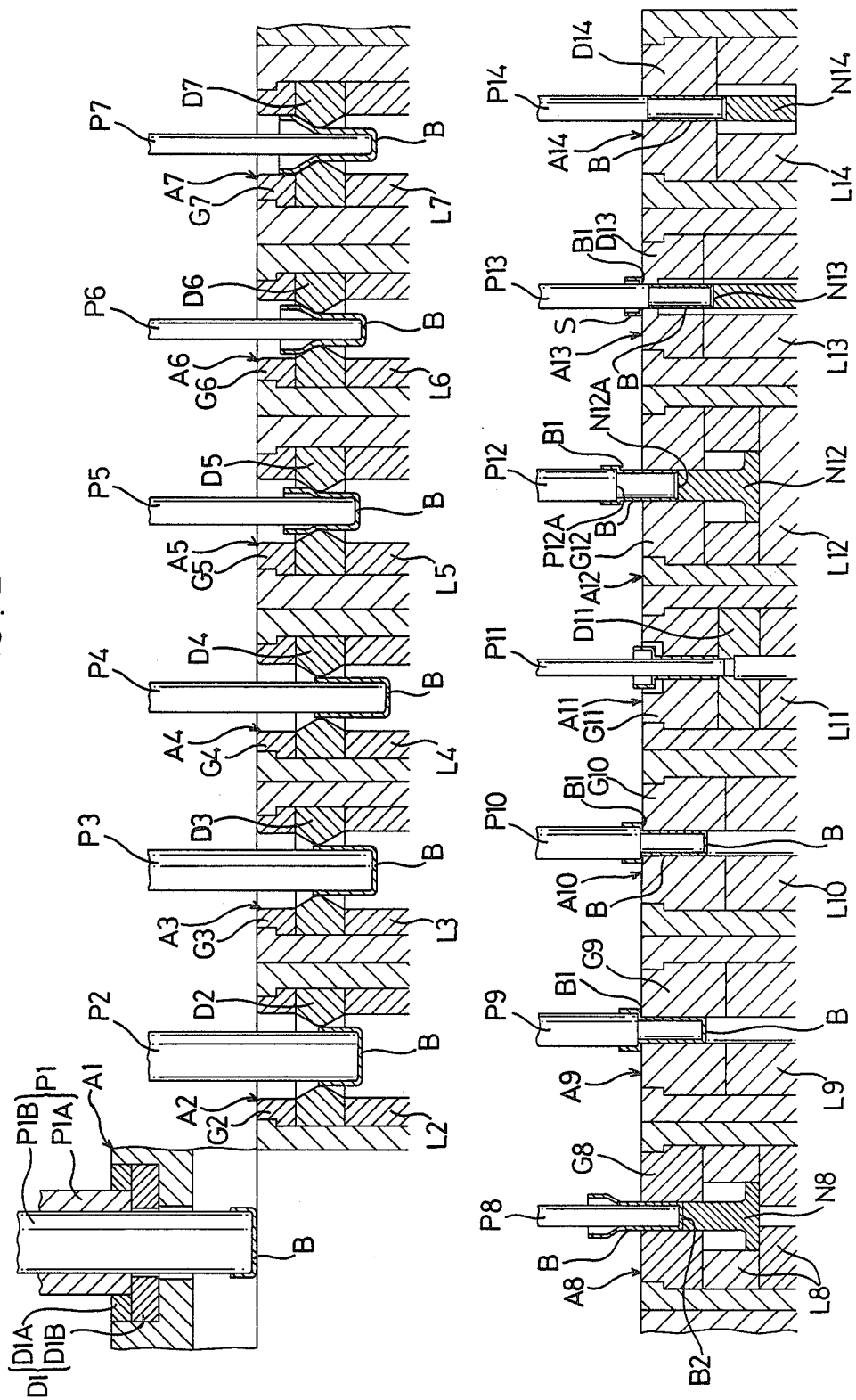
FIG. 2 is a longitudinal section of each machining step.

In other words, the sheet metal material is subjected to the drawing step by means of punches P1, P2... and dies D1, D2... for sequentially reducing its diameter and to increase its depth to form the cylinder B with the bottom. Thereafter, the cylinder B is subjected to the bottom-pressing and flange-pressing steps and then, to the bottom-removal and the sizing steps as well as the beating step, at its either end, thereby forming the tape guide cylinder 1. In the embodiment as shown in FIG. 2, a press machine having a transfer-processing mould provided with successive 15 steps are utilized for the purpose.

In the first step, a first machining mould A1, comprising a punch P1 formed of a blanking punch P1A coaxially with a No. 1 drawing punch P1B and a first die D1 formed of a blanking die D1A coaxially with a No. 1 drawing die D1B, prepares a blank B from a sheet material, which blank is subjected to a low drawing step of a large diameter.

During the second through the seventh machining steps, the blank B of small depth and large diameter is subjected to sequential drawing steps into the blank B of large depth and small diameter by means of second through seventh machining moulds A2–A7 comprising No. 2–No. 7 drawing punches P2–P7 of successively decreasing diameters with corresponding No. 2–No. 7 drawing dies D2–D7.

In the eighth machining step, the resulting material is subjected to a bottom-pressing step by means of an eighth machining mould A8 comprising a No. 8 bottom-pressing punch P8 with a No. 8 knockout N8, a No. 8 liner L8 and No. 8 guide G8.

In the ninth and tenth machining steps, a flange B1 is formed onto the cylindrical blank 8 in such way that the right angle of the flange to the cylindrical body may be formed by means of ninth and tenth machining moulds A9, A10 comprising No. 9, No. 10 flanging-punches P9, P10 and No. 9, No. 10 guides G9, G10.

In the eleventh step, the resulting blank B of a desired shape prepared in the previous steps is freed from its bottom B2 by means of an eleventh machining mould A11 comprising a No. 11 piercing punch P11 and a No. 11 piercing die D11.

In the twelfth machining step, the flange B1 of the blank B' is pressed with a step portion P12A of a punch P12 and is subjected to a chamfering step at a top of the blank B by a knockout N12 by means of a twelfth machining would A12 comprising a No. 12 chamfering punch P12 in the form of a stagewise punching tool, a No. 12 knockout N12 having a chamfering protrusion N12A and a No. 12 liner L12.

In the thirteenth machining step, the flange B1 is trimmed out of the blank B to make it of a standard size by means of a thirteenth machining mould A13 comprising a No. 13 trimming punch P13, a No. 13 trimming die D13 and a No. 13 liner L13. A scrap S remained on the punch P13 is removed therefrom by a stripper (not shown) and is eliminated by an air pressure in the direction normally to a transfer machining line.

Figure 3:
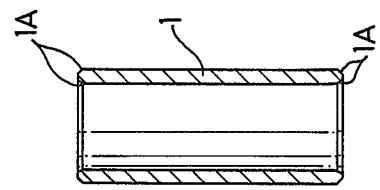
FIG. 3 is a longitudinal section of the tape guide cylinder.

The fourteenth machining mould A14 comprises a beating punch P14 having a stage portion, a No. 14 die D14, a No. 14 knockout N14 and a No. 14 liner L14. While grasping the blank B with the beating punch P14 and the die D14, the blank B at its either end is beaten vertically with a stage portion of the beating punch and with a front end of the knockout N14 to complete the tape guide cylinder 1, as shown in FIG. 3. In this manner, the beating treatment of the grasped blank B provides the constant blank length and the correct alignment of end faces of the blank B relative to its axis.

The fifteenth step does not affect any machining but discharges the finished blank B or the cylinder.

The transfer-machining mould A, as illustrated, may be varied depending on a size of the tape guide cylinder 1 and may be provided with an idle-stage (not shown) for alleviating distortion of the blank B and balance of press loadings. References G2–G11 in the drawings represent guides for holding the blank B and guiding the same to the dies D1–D11, reference G12 represents a guide for guiding the blank B to the knockout N12, and reference L12–L14 stand for liners.

Figure 4:
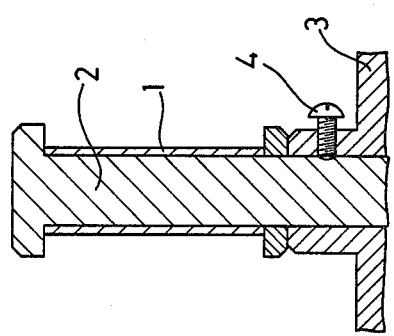
FIGS. 4 and 5 are longitudinal sectional views showing mounting the tape guide cylinder to a base.
Figure 5:
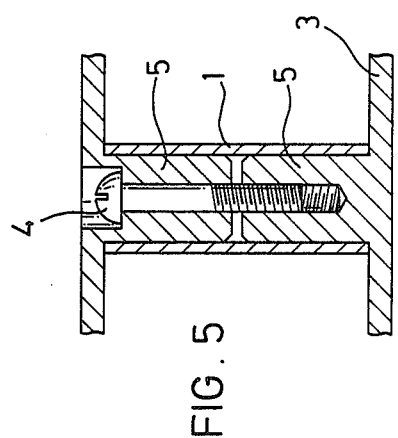

The tape guide cylinder 1 thus prepared may be mounted to a base 3, as shown in FIG. 4, by fitting the tape guide cylinder 1 over a flanged mounting shaft 2 which in turn is fixed to the base 3 with a screw 4. Alternatively, as shown in FIG. 5, a pair of mounting shafts 5 protruding from the base 3 may be covered with the tape guide cylinder 1 (having bevelled portions 1A at its both ends) and fixed thereto with the screw 4.

Figure 6:
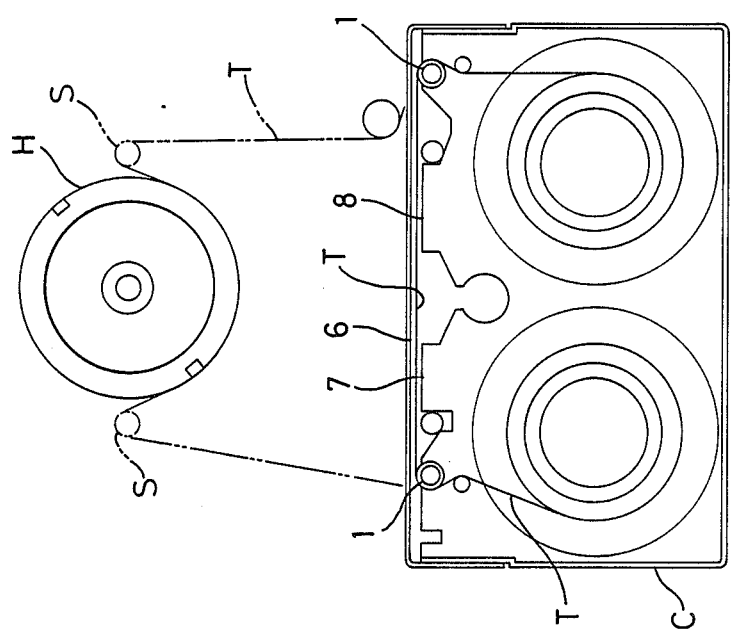
FIG. 6 is a plan view of the mounted state.

As shown in FIG. 6, the tape guide cylinder 1 thus produced may be arranged in a gap 8 near its either end which is located between a shutter cover 6 (which is opened for guiding a tape T to a rotating head H by a tape-guiding shaft S upon recording and playing back) and a case body 7 for the purpose of positioning the tape T substantially at a center of the gap 8 upon closing the cover 6.

In order further to curtail the cost, the amount of material used for the tape guide cylinder also should be reduced as much as possible because a material quality cannot serve for the cost reduction as previously described. After studying the matter, it has been found that the tape guide cylinder always has a fixed outer diameter of 6 mm, an inner diameter of 4.8 mm 16 mm total length, these dimensions have never been altered. As a result of conducting a study in detail, the reason has now been discovered.

At first, since the tape guide cylinder is an important component for operating a tape exactly at a constant speed during recording, playing back and rewinding as described hereinbefore, modification of its material and size would accompany a risk of adversely affecting its accurate function.

Secondly, in a cassette case C, the gap 8 leaves only a small room of about 1 mm when the cover 6 is closed (namely when the cassette case C is removed from a videodeck). Since the tape guide cylinder 1 has the function of positioning the tape T at the center of the gap 8, any modifications in the size of the tape guide cylinder may cause a risk of the tape T to be contacted with either the cover 6 or the case body 7. In order to avoid the risk, the cassette case C itself should be modified in its design. Consequently, a required mould for use in the machining process must be model-changed, resulting in a cost increase.

After reviewing the above two reasons and conducting a number of experiments, however, the following was learned.

At first, in a cassette case 24 the beta-matrix system, the size of the inner and outer diameters of the tape guide cylinder 25 is established for its mounting shape as shown in FIG. 16, so that variation of the size may not be allowed. In the VHS system, however, variation of the outer diameter of the tape guide cylinder 1 is acceptable for its mounting to the cassette case C.

Secondly, the small gap 8 of to the cassette case C is in the order of about 1 mm, preferably 1.4 mm for the constructional necessity, so that reduction of the outer diameter from 6 mm to 5.2 mm has no functional influence on the tape guide cylinder 1 without the risk of contacting the tape T with either the cover 6 or the case body 7.

Thirdly, even if the outer diameter is reduced from 6 mm to 5.2 mm and hence the radial thickness is decreased from 0.6 mm to 0.2 mm, the tape guide cylinder has a sufficient strength for a tape guide.

On the basis of the foregoing knowledge, the tape guide cylinder having a reduced outer diameter has been prepared.

The tape guide cylinder 1 is made of stainless steel and has a 5.2 mm outer diameter, 4.8 mm inner diameter and 16 mm length, and is mounted within the cassette case C for a tape guide, as shown in FIG. 6. This tape guide cylinder 1 has the unchanged inner diameter of 4.8 mm and hence does not necessitate modifying the design of the cassette case C or varying the mould, as shown in FIG. 5. It may be fitted over the mounting shaft 5 each arranged on an outer cover 9 and the case body 7, and then fixed thereto by the mounting screw 4.

The machining procedure of the tape guide cylinder of this type is similar to the procedure described previously, using a sheet material of non-magnetic metal, such as stainless steel, brass, aluminium alloy or other non-ferrous metal.

The cylinder 10 thus formed has an outer diameter of 5.2 mm, an inner diameter of 4.8 mm and a total length of 16 mm.

Thereafter, the cylinder 10 is placed on a blade 11 of a centerless grinding disk, as shown in FIG. 7, and is subjected to a grinding process with a grinding stone 12 and a regulating wheel 13.

Subsequently, as shown in FIG. 8, the cylinder 10 is placed on and in between two feed-rolls for precision finishing, which are arranged oppositely with a little gap therebetween. Then, a burnishing roll 15 is rotated in a press contact with the cylinder 10 at its opposite side from the feed-rollers 14 while the cylinder 10 is moved for a roller-burnishing finish, thereby to provide the cylinder 10 of 5.2 mm outer diameter having a mirror finish on the exterior.

Figure 12:
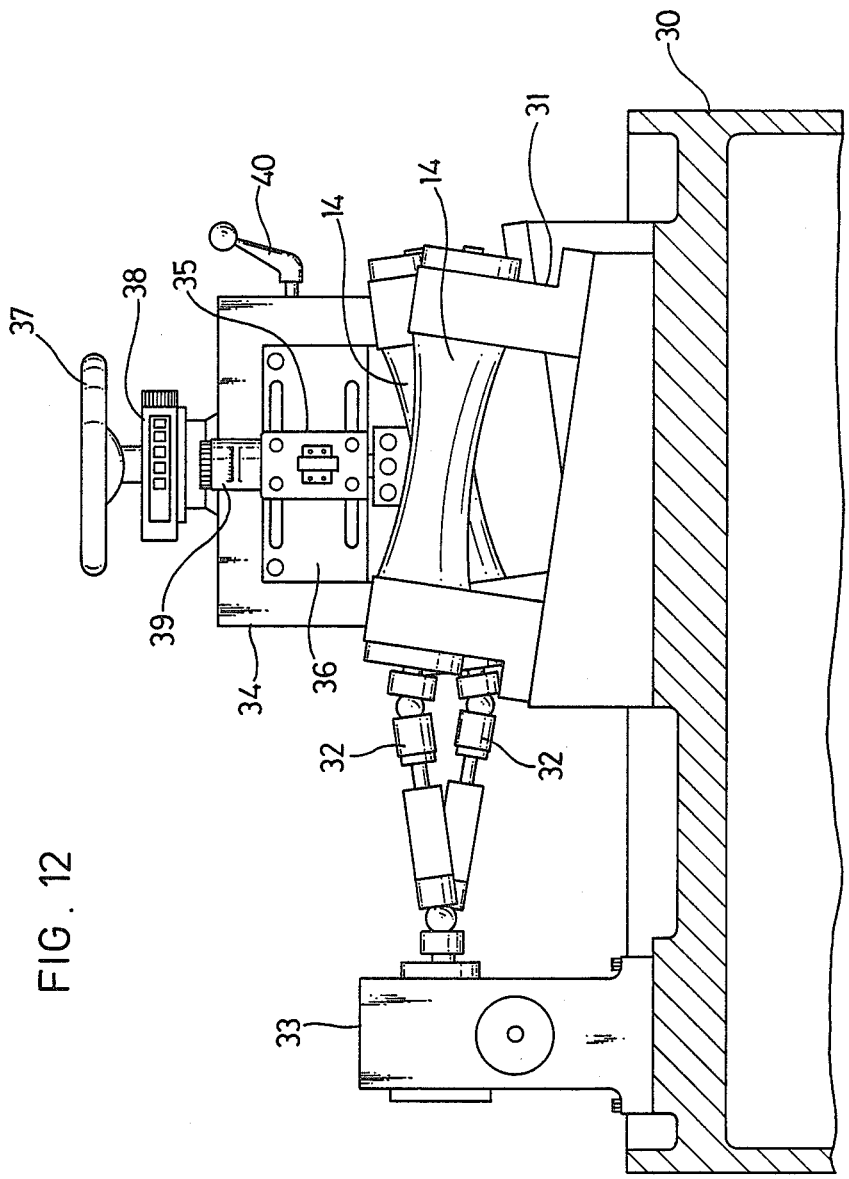
FIG. 12 is a front view of an apparatus for the roller-burnishing.

The roller-burnishing finish may be provided by means of an apparatus, as shown in FIG. 12, wherein reference 30 represents a mounting base while reference 31 represents a pair of feed-roll sets which carry two feed rolls in the form of a hour glass in such a way that these two feed-rolls are inclined vertically at a predetermined angle oppositely to each other for enabling the cylinder 10 to move axially with rotation of the feed-rolls 14, 14. Further, there are shown in FIG. 12 a driving gear box 33 associated with the feed-rolls through universal couplings 32 for driving the feed-rolls, a support means 34 of the burnishing rolls 15 for carrying the latter and urging the cylinder 10, a burnishing roll head 35 forming a portion of the support means, a vertically movable burnishing roll bed 36 also forming a portion of the support means for securing the burnishing roll head 35 at its front face, a feed handle 37 for vertically moving the burnishing roll bed 36, a display means 38 for indicating a degree of the vertical movement of the burnishing rolls 15, a micro-adjusting dial 39 for providing fine adjustment of the vertical movement of the burnishing rolls 15, and a lock lever 40 for fixing the feed handle 37.

Instead of or in addition to the roller-burnishing finish, the cylinder 10 may be subjected to a super-finishing step with a super-finishing disk to provide a mirror finish on the cylinder circumference. This super-finishing step may be carried out, as shown in FIG. 9, by placing the cylinder 10 on two feed rolls 16, 16 slightly spaced apart from each other which are rotated while the cylidner 10 is contacted with a micro-grinding stone 17.

Alternatively, precision-finishing, such as polishing or lapping-tape finishing may be applied in lieu of the roller-burnishing finish.

After the rough grinding step, the precision finishing may be applied through precision-grinding, barrel-grinding, buffing or with a polishing wheel (not shown).

If desired, the cylinder 18 may be prepared by cutting a tubular material or winding a sheet metal material, as shown in FIGS. 10 and 11. In this case, the cylinder 18 at its one end is provided with a notch 19 for preventing rotation, while a shaft 20 is provided with a projection for engaging the notch, thereby to ensure fixation of the cylinder 18.

The tape guide cylinder 1 thus prepared, which has an outer diameter of 5.2 mm, an inner diameter of 4.8 mm and the total length of 16 mm, may be fitted over the mounting shaft 5 of the cassette case C, as shown in FIG. 5.

The tape guide cylinder 1 has a less radial thickness than a conventional tape guide cylinder 22 having an outer diameter of 6 mm, an inner diameter of 4.8 mm and the total length of 16 mm, as shown in FIG. 14, so that the radius of the outer diameter is somewhat smaller, resulting in less strength than those of the conventional cylinder 22. Such decreased strength, however, is still sufficient for the purpose of the tape guide.

Further, the amount of the material to be used in the tape guide cylinder 1, according to the invention, is less than one third($\frac{1}{3}$) relative to that of the conventional cylinder 22, as evidenced by comparing FIG. 13(I) showing the conventional tape guide cylinder 22, FIG. 13(II) showing the tape guide cylinder attempted to have a lesser outer diameter a larger inner diameter for achieving the radial thin wall, and FIG. 13(III) showing the tape guide cylinder 1 according to the invention. Therefore, the ratio of the material required to produce a conventional cylinder 22 to the cylinder 23 is 100 to 34, while the ratio of the conventional cylinder 22 to the cylinder 1 according to the invention is 100 to 31, which provides considerable reduction in the amount of material to be used and hence, produces a tape guide cylinder of a lighter weight. With the tape guide cylinder 23 also, the material curtailment and the weight reduction may be achieved. Such cylinder 23, however, has a larger inside radius and therefore, of a weaker strength than those of the cylinder 1 of the invention, and cannot be mounted to the cassette case C unless the size of the mounting shaft is altered, which results in a considerable cost for the change in model.

On the other hand, a contact area of the tape guide cylinder with the tape T, when mounted to the cassette case C, is smaller in the cylinder 1 of the invention than that of the conventional cylinder 22 due to a smaller radius of the inventive cylinder 1, producing the advantage of decreased frictional resistance.

The tape guide cylinder, which has been subjected to the drawing, the rough grinding and the precision finishing steps, has an increased hardness and durability and strength than the tape guide cylinder which is made by cutting a tube material or winding a sheet metal material.

In accordance with the invention, the outer diameter is not limited to 5.2 mm but may be in the range of 5.2 to 6 mm without adversely affecting function of the tape guide cylinder. However, a size of more than 5.2 mm is more close to that of the conventional cylinder and thus, has a decreased advantage.

If only the inner diameter is increased in order to achieve a radial thin wall, a change in the mould and the cassette case will be required, leading to higher in costs. In this case, however, the purpose of reducing the weight could be achieved.

In accordance with the invention, the tape guide cylinder is prepared by the sequential steps of deep-drawing a sheet metal material to form an elongated cylinder with a bottom, subjecting the resulting cylinder to a flange-machining to form a flange at its open end, thereafter removing the bottom of the cylinder, subsequently, trimming the flange from the cylinder, and finally, subjecting the resulting cylinder, at its either end, to a beat-machining for finishing a shape of the elongated cylinder, so that troublesome transporting operation may be avoided and thus, automization of the process may readily be made, thereby to permit introduction of a transfer-press machine and consistent mass production and thus to further curtail the production costs of the tape guide cylinder. In addition, several drawing steps may facilitate hardening of the material, so that the strength, the hardness and the light weight of the tape guide cylinder may be achieved along with the improved durability and the wear-resistance. Moreover, the cylinder is subjected to the flange-trimming and the final beating steps, so that the uniform tape guide cylinder of a high precision may be produced.

The improved strength and hardness enable the radial thickness of the cylinder to be further decreased thereby to achieve further reduction of the weight.

If the non-magnetic tape guide cylinder is required, then a non-magnetic material may be utilized for preparing the same, as described hereinabove.

The elongated cylinder thus prepared is subjected to the grinding step at its circumference and thereafter to the precision finishing step to provide an outer diameter of more than 5.2 mm but less than 6 mm which is substantially smaller than those of the conventional cylinder, thereby to achieve the reduction of the weight of the cylinder and hence the considerable saving of the material.

From a functional standpoint, the tape guide cylinder according to the invention has no problem of contacting the tape T with the cover 6 or the case body 7 because a sufficient gap of about 1.4 mm is present between the cover 6 and the case body 7 of the cassette case C, while the reduction of the wall thickness is only in the order of 0.4 mm compared with the conventional cylinder 22. Further, the smaller radius may provide a greater strength and the smaller contact area (or the less frictional resistance), resulting in the superior function.

If the process is carried out through the transferpress machining, the centerless grinding step and the precision finish, such as burnishing, then the tape guide cylinder may be prepared in a continuous series of the steps.

Although the invention has been illustrated with its preferred embodiments, it will be appreciated that many variation and modifications may be made without departing from the scope and spirits of the invention.

What is claimed is:

1. A process for preparing a tape guide cylinder, said process comprising the steps of:
   (a) deep-drawing a sheet of metal progressively thereby forming an elongated cylinder having an exterior surface and an inner diameter of at least 4.8 mm, said elongated cylinder comprising a bottom portion and a top portion, wherein said bottom portion includes a closed bottom end and said top portion comprises an open upper end;
   (b) stamping said elongated cylinder thereby forming a flange below said open end of said top portion of said elongated cylinder, said flange separating said top and bottom portions, both of said portions being cylindrical;
   (c) removing said bottom end of said bottom portion from said elongated cylinder;
   (d) trimming said flange from said elongated cylinder; and
   (e) finishing said elongated cylinder by machining the exterior cylindrical surface of said elongated cylinder so as to thereby form said elongated cylinder to have an outer diameter of greater than or equal to 5.2 mm and less than 6 mm.

2. A tape guide cylinder made in accordance with the process of claim 1, comprising an elongated cylinder having an outer diameter of between 5.2–6 mm, an inner diameter of at least 4.8 mm and a total length of at least 16 mm.

3. The cylinder according to claim 2, wherein said sheet of metal comprises a non-magnetic material.

4. The cylinder according to claim 3, wherein said non-magnetic material is selected from the group consisting of stainless steel, brass and an aluminum alloy.

5. The process for preparing a tape guide cylinder according to claim 1, wherein said elongated cylinder is hollow.

6. The process according to claim 5, wherein said sheet metal comprises a non-magnetic metal.

7. The process according to claim 5, wherein said finishing step is performed by means for roller-burnishing or by means for mirror-finishing.

8. The process according to claim 5, wherein said finishing step is performed by means for polishing or by means for precision polishing.

9. The process according to claim 5, wherein said finishing step is performed by means for precision grinding or by means for barrel grinding.

10. The process according to claim 5, wherein said finishing step is performed by means for buffing or by other polishing means comprising polishing wheels.

11. A tape guide cylinder formed by the process of claim 1.

12. A process for preparing a tape guide cylinder in accordance with claim 1, wherein said finishing step comprises finishing said exterior cylindrical surface of said guide cylinder so as to have an outer diameter of approximately 5.2 mm.

13. A process for preparing a tape guide cylinder comprising the steps of:
   (a) deep-drawing a sheet of metal progressively thereby forming an elongated cylinder having an inner diameter of at least 4.8 mm, said elongated cylinder comprising a bottom portion and a top portion, wherein said bottom portion comprises a closed bottom end and said top portion comprises an open upper and;
   (b) stamping said elongated cylinder thereby forming a flange below said open end of said top portion of said elongated cylinder, wherein said flange is adapted to connect said top and bottom portions, said flange separating said top and bottom portions, both of said portions being cylindrical;
   (c) removing said bottom end of said bottom portion from said elongated cylinder;
   (d) trimming said flange from said elongated cylinder;
   (e) die-shaping the outer surfaces of said top portion and said bottom portion of said elongated cylinder;
   (f) grinding the external surface of said hollow and elongated cylinder; and
   (g) precision finishing an exterior surface of said ground hollow and elongated cylinder thereby obtaining an outer diameter for said elongated cylinder of greater than or equal to 5.2 mm and less than 6 mm.

14. A tape guide cylinder made in accordance with the process of claim 13, comprising an elongated cylinder having an outer diameter of between 5.2–6 mm, an inner diameter of at least 4.8 mm and a total length of at least 16 mm.

15. The tape guide cylinder according to claim 14, wherein said tape guide cylinder is made of a non-magnetic metal.

16. The tape guide cylinder according to claim 15, wherein said metal is selected from the group consisting of stainless steel, brass and an aluminum alloy.

17. The process for preparing a tape guide cylinder according to claim 13 wherein said elongated cylinder is hollow.

18. A tape guide cylinder formed by the process of claim 13.

19. A process for preparing a tape guide cylinder in accordance with claim 12 wherein said finishing step comprises finishing said exterior cylindrical surface of said guide cylinder so as to have an outer diameter of approximately 5.2 mm.

* * * * *

UNITED STATES PATENT AND TRADEMARK OFFICE
CERTIFICATE OF CORRECTION

PATENT NO. : 4,754,908

DATED : July 5, 1988

INVENTOR(S) : M. TANAKA et al.

It is certified that error appears in the above-identified patent and that said Letters Patent is hereby corrected as shown below:

At column 4, line 2, change "would" to ---mould---.

At column 5, line 23, delete "to" before "the".

At column 6, line 5, change "a" (first occurrence) to ---an---.

At column 8, line 15, change "transferpress" to ---transfer-press---.

At column 10, line 27, change "12" to ---13---.

Signed and Sealed this

Nineteenth Day of June, 1990

Attest:

HARRY F. MANBECK, JR.

*Attesting Officer*     Commissioner of Patents and Trademarks